G. PIRRUNG.

COMBINED SCRUBBER AND MOP.

No. 10,154. Reissued July 11, 1882.

Witnesses:
Frank Thomasson
S. S. Schoff

Inventor:
George Pirrung
by Jas. H. Coyne
Att'y.

N. PETERS, Photo-Lithographer, Washington, D. C.

UNITED STATES PATENT OFFICE.

GEORGE PIRRUNG, OF RAVENSWOOD, ILLINOIS.

COMBINED SCRUBBER AND MOP.

SPECIFICATION forming part of Reissued Letters Patent No. 10,154, dated July 11, 1882.

Original No. 155,888, dated October 13, 1874. Application for reissue filed March 28, 1882.

*To all whom it may concern:*

Be it known that I, GEORGE PIRRUNG, of Ravenswood, in the county of Cook and State of Illinois, have invented a certain new and useful Improved Combined Scrubber and Mop, of which the following is a full and exact description, which will enable others to make and use same, reference being had to the drawings and letters of reference marked thereon.

My invention consists of a mopping contrivance attached to a handle, consisting of a water-receiving box and a strip of thick flexible rubber so contrived that by placing the edge of the rubber strip on the floor and pulling quickly along it will spring back from the water-box, forming an opening into it, through which it will force the water which it gathers from the floor in its front. When it is quickly lifted from the floor it will instantly close the water-box, and thus confine the water, which may be poured out into a pail or other receptacle.

Figure 1:
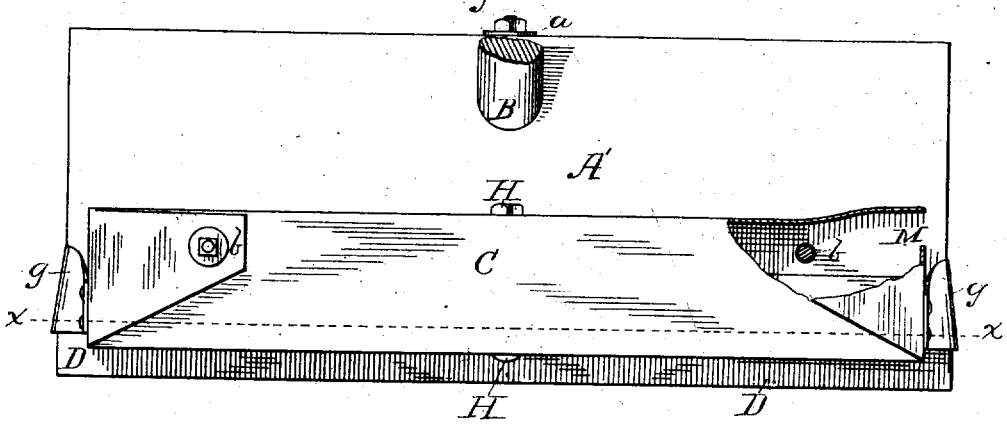
Figure 2:
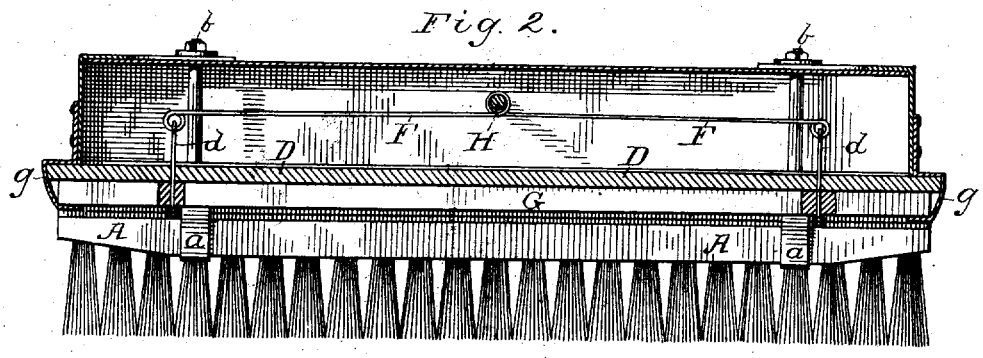
Figure 3:
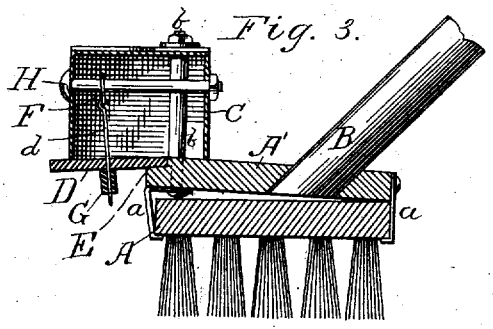

In the drawings, Figure 1 is a plan view of my invention. Fig. 2 is a longitudinal sectional elevation of the same, taken on the line *x x* of Figs. 1 and 3. Fig. 3 is a cross-section taken on the line *y y* of Fig. 1.

A represents an ordinary rectangular-shaped scrubbing-brush, attached to a corresponding-shaped board or false brush-back, A′, immediately above it, by means of the hooks *a a*, the whole of which is manipulated by the handle B, projecting upward and obliquely from said board.

Attached longitudinally to the false back A′, on and over the side opposite to that near which the handle is inserted, and secured thereto by the vertical bolts *b*, is the water-box C, made of one piece of sheet metal and open at the bottom. It is so placed that one half rests upon and the other half projects out from said false back, thus leaving a longitudinal open space equal to one-half the area of the bottom of the box. Covering this longitudinal opening is an elastic india-rubber strip, D, secured by one edge in the rabbet E in the contiguous side of the false back, and having its other edge project beyond the water-box, against which it bears firmly. As the strip C is liable to lose its elasticity after it has been in use for a short time, I maintain its upward pressure by means of the pressure-bar G, which is placed longitudinally and centrally under said strip, and acquires its upward tendency from the spring F through the medium of the connecting-rods *d d*, said spring being supported by the horizontal bolt H, which passes transversely and centrally through the water-box.

M is an opening at one end and side of the box nearest the handle for pouring out the water taken up from the floor.

The holes in the box C for the bolt *b*, by which said box is fastened to the head A′, are elongated or slotted, so that the box can be shifted up along the false back from time to time as the rubber strip wears away.

The rubber clips *g g* at the end of the strip D are also useful for preventing the water from flowing around the ends of the same as it is forced against the water.

To operate my invention, after the floor has been scrubbed the brush is reversed, thus bringing the projecting edge of the rubber strip to bear on the floor. Then by pulling it quickly along the floor the rubber will be sprung backward from the edge of the water-box, thus opening a little space through which the water on the floor, being drawn or lapped upward, will enter the box, where it will be confined by the rubber, closing instantly when at the moment of stopping the machine is lifted from the floor. Thus it will be seen that after scrubbing the floor with the brush the water may be quickly mopped up and disposed of, the work being done quicker, better, and with less labor than by common mops, and that both the scrubbing and mopping may be done by the same instrument.

What I claim as new, and desire to secure by Letters Patent, is—

1. The combination of the water-box C and the flexible strip D, forming part or all of the bottom and projecting beyond the side of said box, and the devices for exerting pressure on the strip, consisting of the bar G, rods F, and a spring, E, as shown and described.

2. A combined mop and scrubber consisting of a brush, a water-box placed longitudinally over and projecting from the side of the back of said brush, so as to form a longitudinal opening, and a rubber strip projecting beyond the side of said box, closing said opening, substantially as and for the purpose specified.

GEORGE PIRRUNG.

Witnesses:

JAMES H. COYNE,

FRANK D. THOMASON.